(12) United States Patent
Lin

(10) Patent No.: US 12,334,723 B2
(45) Date of Patent: Jun. 17, 2025

(54) POWER ADJUSTING SYSTEM AND METHOD

(71) Applicant: ADATA TECHNOLOGY CO., LTD., New Taipei (TW)

(72) Inventor: Chi-Chien Lin, Keelung (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 182 days.

(21) Appl. No.: 18/243,145

(22) Filed: Sep. 7, 2023

(65) Prior Publication Data
US 2024/0429702 A1 Dec. 26, 2024

(30) Foreign Application Priority Data

Jun. 20, 2023 (TW) ................................ 112123077

(51) Int. Cl.
| | |
|---|---|
| *H02H 7/08* | (2006.01) |
| *B60L 15/20* | (2006.01) |
| *H02H 7/09* | (2006.01) |
| *H02J 7/00* | (2006.01) |

(52) U.S. Cl.
CPC ............ *H02H 7/0833* (2013.01); *H02H 7/09* (2013.01); *H02J 7/00304* (2020.01); *H02J 7/0047* (2013.01); *H02J 7/0063* (2013.01); *B60L 15/20* (2013.01)

(58) Field of Classification Search
CPC ..... H02H 7/0833; H02H 7/09; H02J 7/00304; H02J 7/0047; H02J 7/0063; B60L 15/20
See application file for complete search history.

(56) References Cited

U.S. PATENT DOCUMENTS

| | | | |
|---|---|---|---|
| 6,392,376 B1 | 5/2002 | Kobayashi et al. | |
| 9,376,024 B2 | 6/2016 | Namou et al. | |
| 2015/0061567 A1* | 3/2015 | Gorka | H02P 25/22 |
| | | | 323/282 |

(Continued)

FOREIGN PATENT DOCUMENTS

| | | |
|---|---|---|
| CN | 100454750 C | 2/2009 |
| CN | 104682692 A | 6/2015 |

(Continued)

*Primary Examiner* — Zoheb S Imtiaz
(74) *Attorney, Agent, or Firm* — Li & Cai Intellectual Property (USA) Office

(57) ABSTRACT

A power adjusting system and method are provided. The power adjusting method is applicable to the power adjusting system. The power adjusting method includes processes of: detecting an input voltage of the power adjusting system by a detector circuit of the power adjusting system; detecting voltages of first terminals of high-side switches of the power adjusting system by the detector circuit; detecting a voltage of a battery by the detector circuit; detecting currents flowing to the high-side switches by the detector circuit; detecting a current flowing through the battery; detecting a current flowing through a motor; determining whether or not abnormal conditions occur in the power adjusting system and the motor according to the detected voltages and currents, and accordingly controlling operations of the high-side switches and low-side switches and a switching circuit of the power adjusting system, by a controller circuit of the power adjusting system.

15 Claims, 8 Drawing Sheets

(56) References Cited

U.S. PATENT DOCUMENTS

| | | | | |
|---|---|---|---|---|
| 2016/0079892 A1* | 3/2016 | Arafat | ............. | H02M 1/32 |
| | | | | 318/400.28 |
| 2020/0307383 A1* | 10/2020 | Fukui | ............. | B60L 3/04 |
| 2024/0339990 A1* | 10/2024 | Namuduri | ............. | H02J 7/0063 |
| 2025/0007365 A1* | 1/2025 | Zhang | ............. | H02K 11/0094 |

FOREIGN PATENT DOCUMENTS

| | | |
|---|---|---|
| CN | 105405425 A | 3/2016 |
| CN | 106549606 A | 3/2017 |
| CN | 208530303 U | 2/2019 |
| CN | 110234531 B | 8/2022 |
| CN | 110431723 B | 6/2023 |
| DE | 102018206096 A1 | 10/2019 |
| JP | 202243921 A | 3/2022 |
| TW | I257761 B | 7/2006 |
| TW | 202101849 A | 1/2021 |
| WO | WO2021104664 A1 | 6/2021 |

* cited by examiner

POWER ADJUSTING SYSTEM AND METHOD

CROSS-REFERENCE TO RELATED PATENT APPLICATION

This application claims the benefit of priority to Taiwan Patent Application No. 112123077, filed on Jun. 20, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power adjusting system, and more particularly to power adjusting system and method that are applicable to a motor.

BACKGROUND OF THE DISCLOSURE

Ideally, electric vehicles will eventually replace fuel vehicles and be used as the primary method of transportation in the future. Therefore, electric vehicles have undergone continuous development in the automobile industry. In order to bring about the popularization of electric vehicles in the future, it is necessary to improve the performance of charging piles on the charging and driving of the electric vehicles.

SUMMARY OF THE DISCLOSURE

In response to the above-referenced technical inadequacies, the present disclosure provides a power adjusting system. The power adjusting system includes a switching circuit, a motor driver circuit, a detector circuit and a controller circuit. The switching circuit includes a first switching component, a second switching component and a third switching component. A first terminal of the third switching component is connected to an input power source. A second terminal of the third switching component is connected to a first terminal of the first switching component. A second terminal of the first switching component and a first terminal of the second switching component are connected to a positive terminal of a battery. A second terminal of the second switching component is connected to a first terminal of each of a plurality of coils of a motor. The motor driver circuit includes a plurality of high-side switches and a plurality of low-side switches. A first terminal of each of the plurality of high-side switches is connected to the second terminal of the third switching component and the first terminal of the first switching component. Second terminals of the plurality of high-side switches are respectively connected to first terminals of the plurality of low-side switches, and are respectively connected to second terminals of the plurality of coils of the motor. A second terminal of each of the plurality of low-side switches is connected to a negative terminal of the battery. The detector circuit is connected to wires between the motor driver circuit and the switching circuit. The detector circuit is configured to detect voltages and currents at the wires between the motor driver circuit and the switching circuit to output a detected signal. The controller circuit is connected to the switching circuit, a control terminal of each of the plurality of high-side switches, a control terminal of each of the plurality of low-side switches and the detector circuit. The controller circuit is configured to control operations of each of the plurality of high-side switches, each of the plurality of low-side switches and the switching circuit according to the detected signal from the detector circuit. In a battery charging mode, the controller circuit turns on the third switching component and the second switching component such that power supplied by the input power source sequentially flows through the third switching component, one or more of the plurality of high-side switches, the motor and the second switching component to the battery. In a motor driving mode, the controller circuit turns on the first switching component such that power supplied by the input power source sequentially flows through the first switching component and one or more of the plurality of low-side switches to the motor.

In addition, the present disclosure provides a power adjusting method. The power adjusting method is applicable to the power adjusting system. The power adjusting method includes steps of: (a) turning off the first switching component, the second switching component and the third switching component, by the controller circuit; (b) detecting a voltage at a node between the first terminal of the third switching component and the input power source, by the detector circuit; (c) determining, by the controller circuit, whether to enter the battery charging mode or not, in response to determining to enter the battery charging mode, performing the steps (d) to (f) before entering the battery charging mode, and in response to determining not to enter the battery charging mode, performing the step (g); (d) detecting a voltage at a node between the second terminal of the third switching component and the first terminal of each of the plurality of high-side switches, by the detector circuit; (e) detecting a voltage at a node between the first terminal of the second switching component and the positive terminal of the battery, by the detector circuit; (f) determining, by the controller circuit, whether an abnormality occurs in the second switching component and the third switching component according to the voltage at the node between the first terminal of the third switching component and the input power source, the voltage at the node between the second terminal of the third switching component and the first terminal of each of the plurality of high-side switches and the voltage at the node between the first terminal of the second switching component and the positive terminal of the battery, and accordingly controlling the operations of each of the plurality of high-side switches, each of the plurality of low-side switches and the switching circuit; (g) determining, by the controller circuit, whether to enter the motor driving mode or not, and in response to determining to enter the motor driving mode, sequentially performing the steps (h) to (j), and in response to determining not to enter the motor driving mode, returning to the step (a); (h) detecting a voltage at a node between the first terminal of the first switching component and each of the plurality of high-side switches, by the detector circuit; (i) detecting a voltage at a node between the positive terminal of the battery and the second terminal of the first switching component, by the detector circuit; and (j) determining, by the controller circuit, whether an abnormality occurs in the second switching component and the third switching component according to voltage at the node between the first terminal of the first switching component and each of the plurality of high-side switches and the voltage at the node between the positive terminal of the battery and the second terminal of the first switching component, and accordingly controlling the operations of each of the plurality of high-side switches, each of the plurality of low-side switches and the switching circuit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
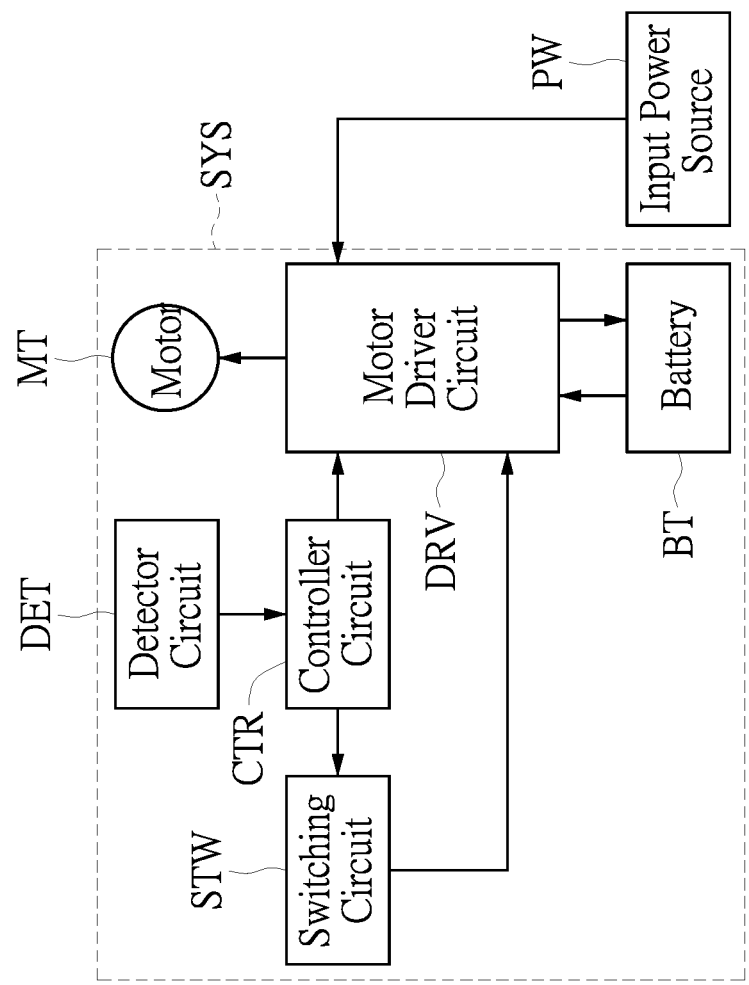
FIG. 1 is a block diagram of a power adjusting system according to first and second embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
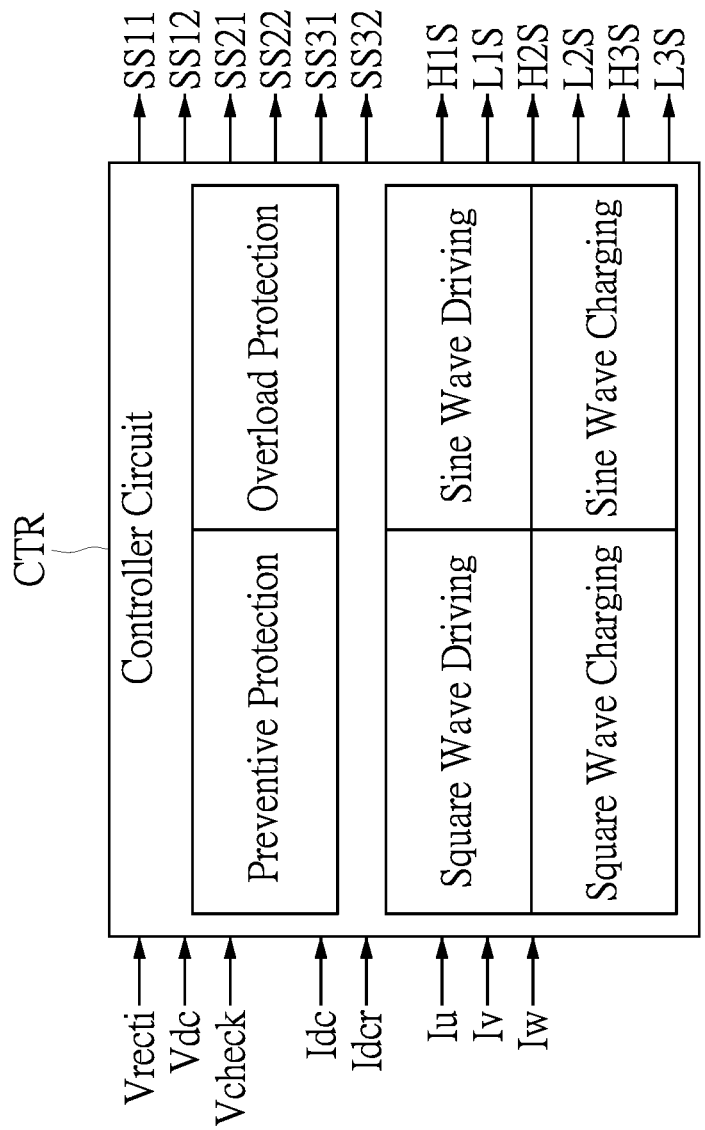
FIG. 2 is a block diagram of a controller circuit of the power adjusting system according to the first and second embodiments of the present disclosure.
Figure 3:
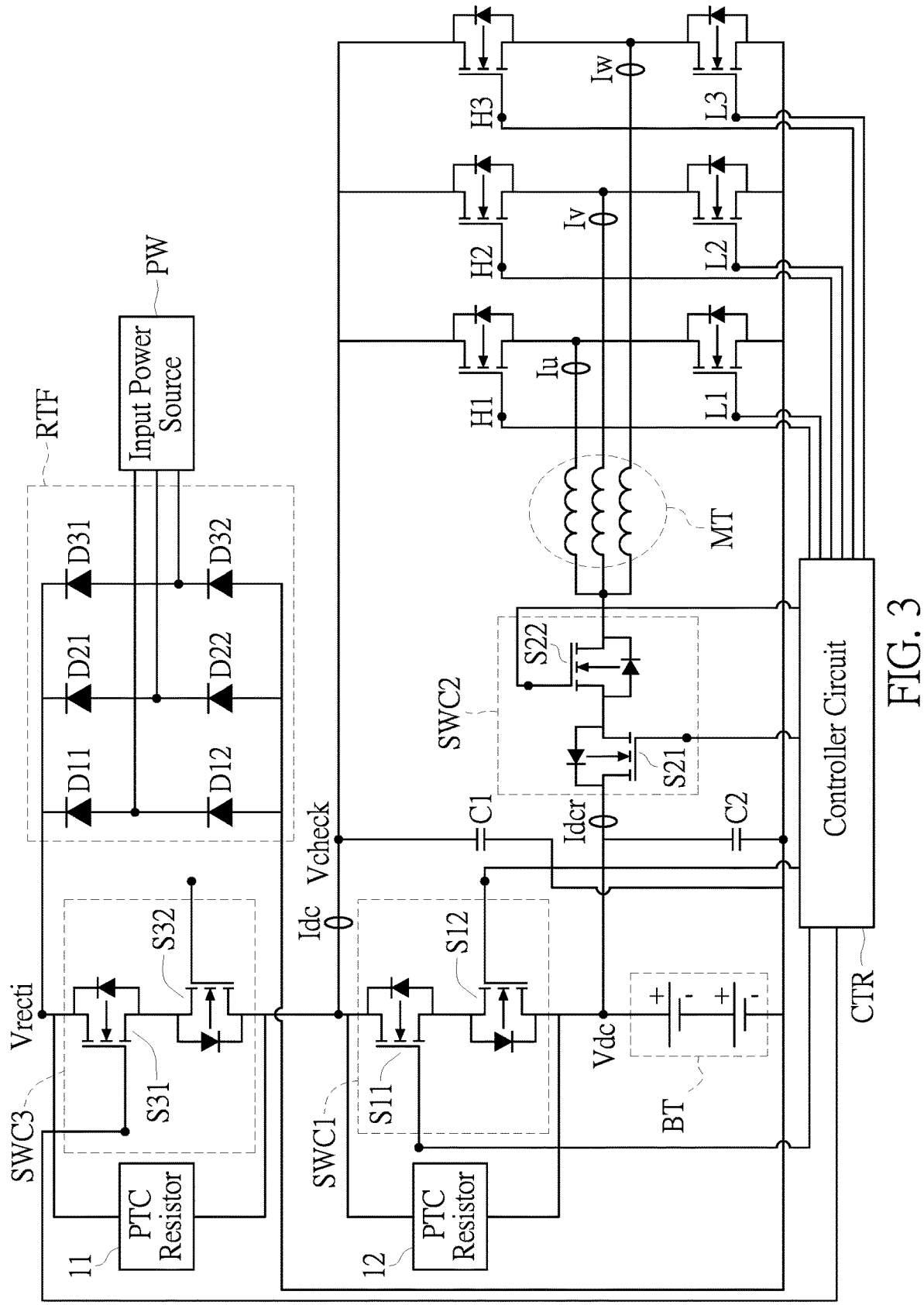
FIG. 3 is a circuit diagram of the power adjusting system according to the first embodiment of the present disclosure.
Figure 4:
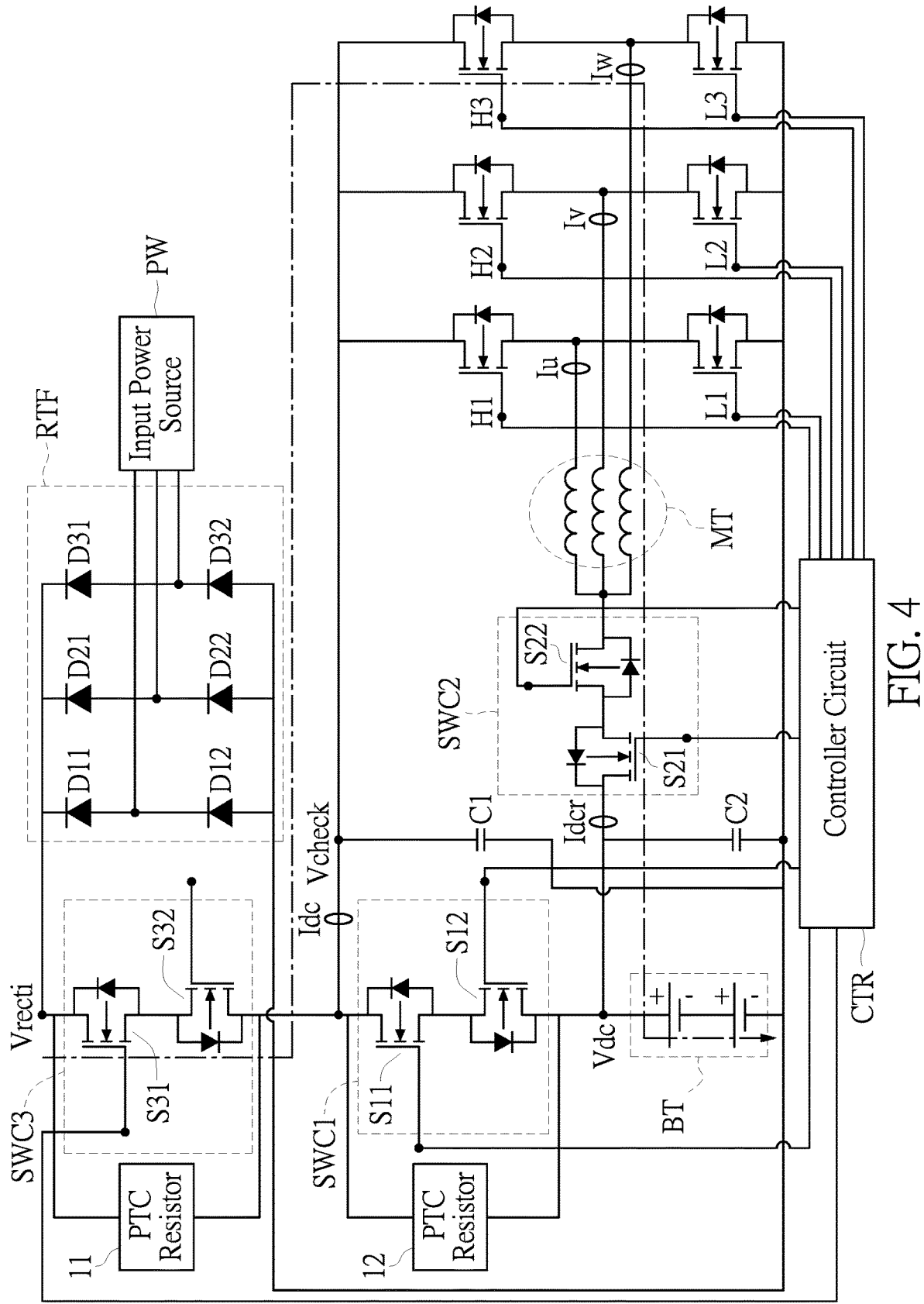
FIG. 4 is a schematic diagram of a flowing direction of a current of the power adjusting system in a battery charging mode according to the first embodiment of the present disclosure.
Figure 5:
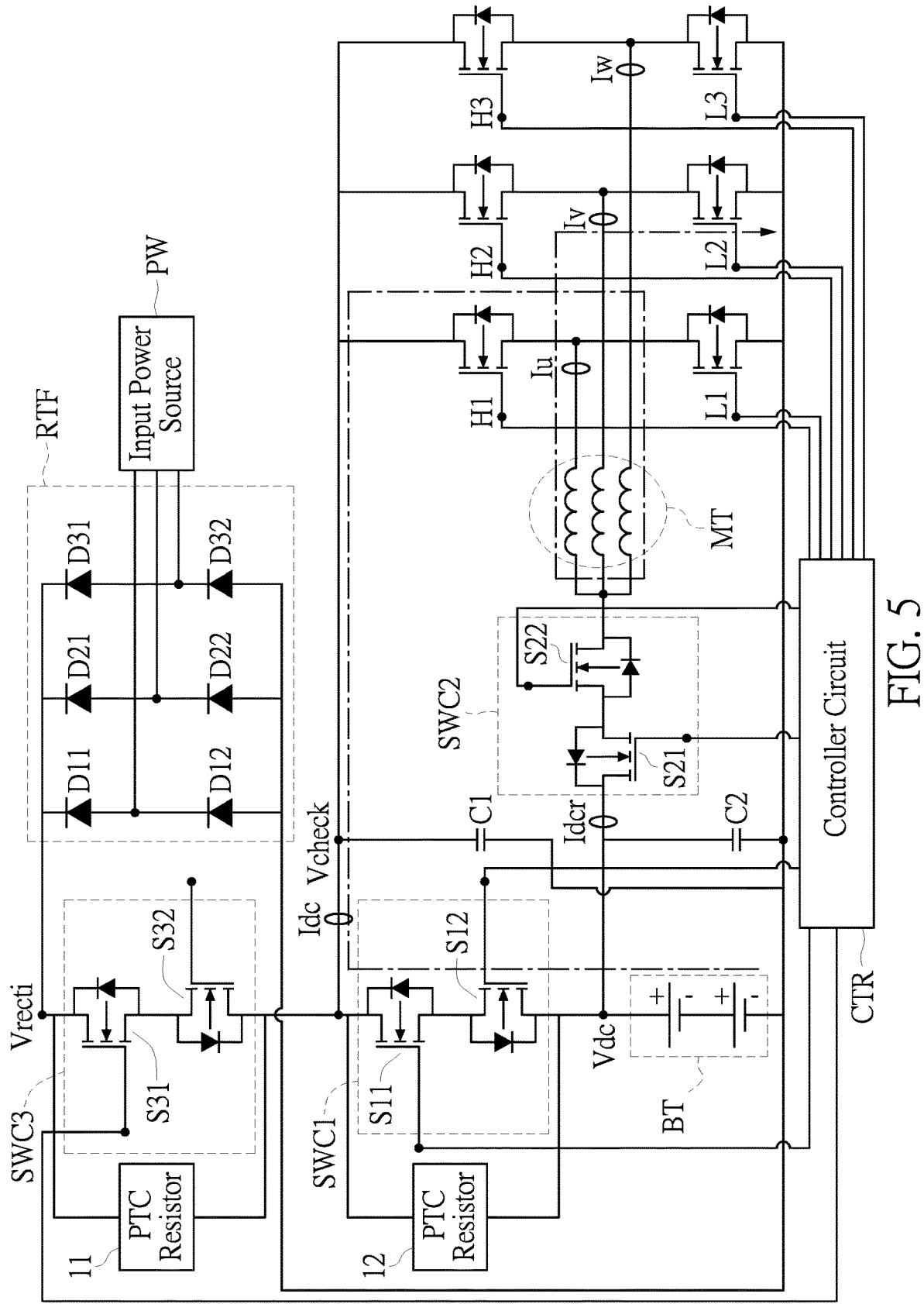
FIG. 5 is a schematic diagram of a flowing direction of a current of the power adjusting system in a motor driving mode according to the first embodiment of the present disclosure.

Reference is made to FIG. 1 to FIG. 5, in which FIG. 1 is a block diagram of a power adjusting system according to first and second embodiments of the present disclosure, FIG. 2 is a block diagram of a controller circuit of the power adjusting system according to the first and second embodiments of the present disclosure, FIG. 3 is a circuit diagram of the power adjusting system according to the first embodiment of the present disclosure, FIG. 4 is a schematic diagram of a flowing direction of a current of the power adjusting system in a battery charging mode according to the first embodiment of the present disclosure, and FIG. 5 is a schematic diagram of a flowing direction of a current of the power adjusting system in a motor driving mode according to the first embodiment of the present disclosure.

As shown in FIG. 1, a power adjusting system SYS of the present disclosure includes a switching circuit STW, a controller circuit CTR, a detector circuit DET and a motor driver circuit DRV. The power adjusting system SYS of the present disclosure is applicable for charging a battery BT of an autonomous mobile device (such as, but not limited to an electric vehicle) and driving a motor MT of the autonomous mobile device to rotate.

The switching circuit STW may include a first switching component SWC1, a second switching component SWC2 and a third switching component SWC3. In the first embodiment of the present disclosure, the first switching component SWC1 includes a first switch S11 and a second switch S12, the second switching component SWC2 includes a first switch S21 and a second switch S22, and the third switching component SWC3 includes a first switch S31 and a second switch S32.

If necessary, the power adjusting system SYS of the present disclosure may further include a rectifier circuit RTF as shown in FIG. 3. For example, the rectifier circuit RTF may include a first high-side diode D11, a first low-side diode D12, a second high-side diode D21, a second low-side diode D22, a third high-side diode D31 and a third low-side diode D32.

A positive terminal of the first low-side diode D12, a positive terminal of the second low-side diode D22 and a positive terminal of the third low-side diode D32 are connected to a second terminal of a second capacitor C2. A first terminal of the second capacitor C2 is connected to a positive terminal of the battery BT.

A positive terminal of the third high-side diode D31, a positive terminal of the second high-side diode D21 and a positive terminal of the first high-side diode D11 are connected to an input power source PW, and are respectively connected to a negative terminal of the third low-side diode D32, a negative terminal of the second low-side diode D22 and a negative terminal of the first low-side diode D12.

A negative terminal of the third high-side diode D31, a negative terminal of the second high-side diode D21 and a negative terminal of the first high-side diode D11 are connected to a first terminal of the first switch S31 of the third switching component SWC3. A second terminal of the first switch S31 of the third switching component SWC3 is connected to a first terminal of the second switch S32 of the third switching component SWC3.

A second terminal of the second switch S32 of the third switching component SWC3 is connected to a first terminal of the first high-side switch H1, a first terminal of the second high-side switch H2, a first terminal of the third high-side switch H3, and a first terminal of a first capacitor C1. A second terminal of the first capacitor C1 is connected to a negative terminal of the battery BT.

If necessary, the third switching component SWC3 may be connected to a positive temperature coefficient (PTC) component 11 (such as a PTC resistor) in parallel, and the first switching component SWC1 may be connected to a positive temperature coefficient (PTC) component 12 (such as a PTC resistor) in parallel.

A second terminal of the first high-side switch H1 is connected to a first terminal of the first low-side switch L1. A second terminal of the second high-side switch H2 is connected to a first terminal of the second low-side switch L2. A second terminal of the third high-side switch H3 is connected to a first terminal of the third low-side switch L3. A second terminal of the first low-side switch L1, a second terminal of the second low-side switch L2 and a second terminal of the third low-side switch L3 are connected to the negative terminal of the battery BT.

A node between the second terminal of the first high-side switch H1 and the first terminal of the first low-side switch L1 is connected to a second terminal of a coil of a U-phase of the motor MT such as a three-phase motor. A node between the second terminal of the second high-side switch H2 and the first terminal of the second low-side switch L2 is connected to a second terminal of a coil of a V-phase of the motor MT such as the three-phase motor. A node between the second terminal of the third high-side switch H3 and the first terminal of the third low-side switch L3 is connected to a second terminal of a coil of a W-phase of the motor MT such as the three-phase motor.

A first terminal of the coil of the U-phase of the motor MT such as the three-phase motor, a first terminal of the coil of the V-phase of the motor MT and a first terminal of the coil of the W-phase of the motor MT are connected to a second terminal of the second switch S22 of the second switching component SWC2. A first terminal of the second switch S22 of the second switching component SWC2 is connected to a second terminal of the first switch S21 of the second switching component SWC2. A first terminal of the first switch S21 of the second switching component SWC2 is connected to the positive terminal of the battery BT.

The positive terminal of the battery BT is connected to a second terminal of the second switch S12 of the first switching component SWC1. A second terminal of the first switch S11 of the first switching component SWC1 is connected to a first terminal of the second switch S12 of the first switching component SWC1. A first terminal of the first switch S11 of the first switching component SWC1 is connected to the first terminal of the first high-side switch H1, the first terminal of the second high-side switch H2 and the first terminal of the third high-side switch H3.

The controller circuit CTR is connected to a control terminal of the first high-side switch H1, a control terminal of the second high-side switch H2, a control terminal of the third high-side switch H3, a control terminal of the first low-side switch L1, a control terminal of the second low-side switch L2, a control terminal of the third low-side switch L3, control terminals of the first switch S11 and the second switch S12 of the first switching component SWC1, control terminals of the first switch S21 and the second switch S22 of the second switching component SWC2, and control terminals of the first switch S31 and the second switch S32 of the third switching component SWC3.

In the battery charging mode and the motor driving mode, the controller circuit CTR may output a plurality of control signals H1S, L1S, H2S, L2S, H3S, L3S respectively to the control terminals of the first high-side switch H1, the first low-side switch L1, the second high-side switch H2, the second low-side switch L2, the third high-side switch H3 and the third low-side switch L3 of the motor driver circuit DRV to control operations of the motor driver circuit DRV.

In the battery charging mode, the controller circuit CTR turns on the first switch S31 and the second switch S32 of the third switching component SWC3, and turns on the first switch S21 and the second switch S22 of the second switching component SWC2. At this time, as shown in FIG. 4, a current supplied by the input power source PW sequentially flows through the third switching component SWC3, one or more of the plurality of high-side switches H1 to H3, the motor MT and the second switching component SWC2 to the battery BT.

In the motor driving mode, the controller circuit CTR turns on the first switch S11 and the second switch S12 of the first switching component SWC1. At this time, as shown in FIG. 5, a current supplied by the battery BT of the autonomous mobile device (such as, but not limited to the electric vehicle) sequentially flows through the first switching component SWC1 and one or more of the plurality of high-side switches H1 to H3 to the motor MT.

Figure 6:
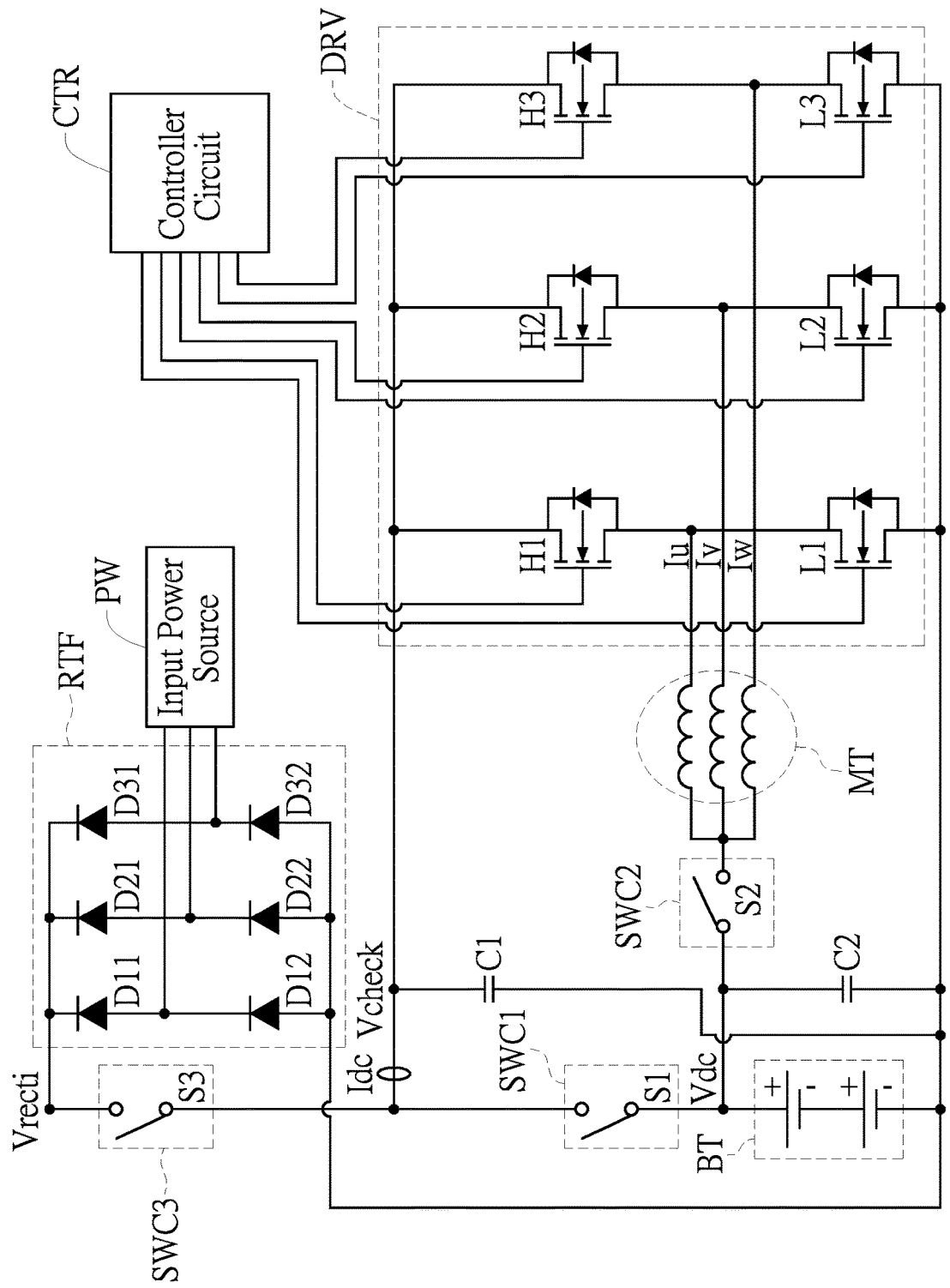
FIG. 6 is a circuit diagram of the power adjusting system according to the second embodiment of the present disclosure.

Reference is made to FIG. 6, which is a circuit diagram of the power adjusting system according to the second embodiment of the present disclosure.

Differences between the second and first embodiments of the present disclosure are that, in the second embodiment, the first switching component SWC1 only includes a first switch S1, the second switching component SWC2 only includes a first switch S2, the third switching component SWC3 only includes a first switch S3 as shown in FIG. 6. The configurations of the circuit components of the power adjusting system of the second embodiment of the present disclosure that are the same as or similar to that of the first embodiment of the present disclosure are not repeated herein.

Figure 7:
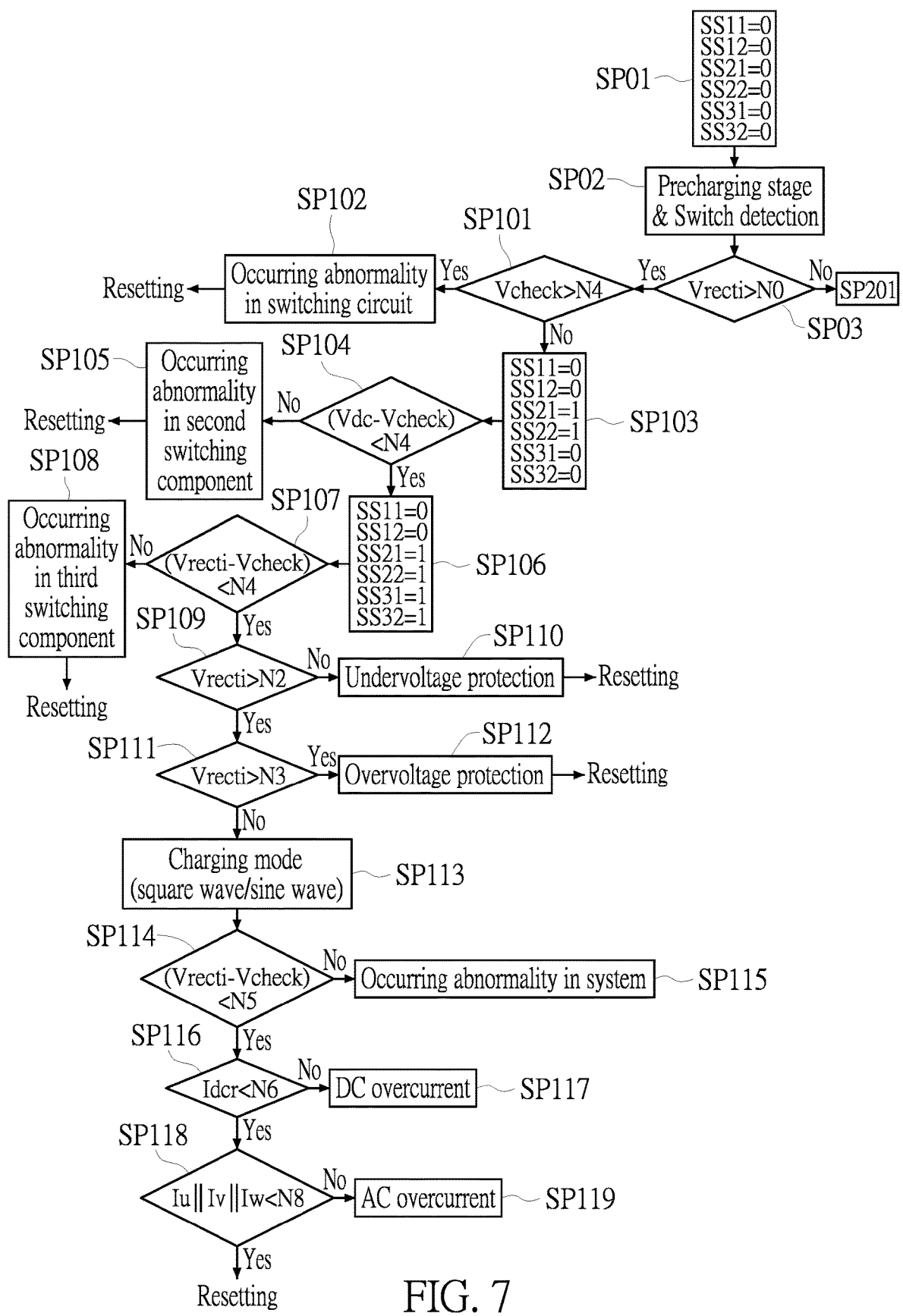
FIG. 7 is a flowchart diagram of steps of a power adjusting method that are performed by the power adjusting system in the battery charging mode according to the first embodiment of the present disclosure.

Reference is made to FIGS. 3 to 5 and FIG. 7, in which FIG. 7 is a flowchart diagram of steps of a power adjusting method that are performed by the power adjusting system in the battery charging mode according to the first embodiment of the present disclosure.

In the power adjusting method of the present disclosure, the power adjusting system as shown in FIG. 3 (or the power adjusting system as shown in FIG. 6) may perform steps SP01 to SP03 and SP01 to SP119 as shown in FIG. 7. The steps SP01 to SP03 are performed before the power adjusting system enters the battery charging mode. The steps SP01 to SP119 are performed when the power adjusting system determines to enter and has entered the battery charging mode.

Before entering the battery charging mode, the controller circuit CTR outputs a plurality of control signals SS11, SS12, SS21, SS22, SS31, SS32 (at a low level) respectively to the control terminals of the first switch S11 and the second switch S12 of the first switching component SWC1 as shown in FIG. 3 (or the control terminal of the first switch S1 as shown in FIG. 6), the control terminals of the first switch S21 and the second switch S22 of the second switching component SWC2 as shown in FIG. 3 (or the control terminal of the first switch S2 as shown in FIG. 6), and the control terminals of the first switch S31 and the second switch S32 of the third switching component SWC3 as shown in FIG. 3 (or the control terminal of the first switch S3 as shown in FIG. 6) (in step SP01 as shown in FIG. 7). As a result, the first switching component SWC1, the second switching component SWC2 and the third switching component SWC3 are turned off.

When the first switching component SWC1, the second switching component SWC2 and the third switching component SWC3 are turned off, the detector circuit DET as shown in FIG. 1 may detect a voltage Vrecti at a node between the first terminal of the first switch S31 of the third switching component SWC3 and the input power source PW as shown in FIG. 3 (in step SP02 as shown in FIG. 7).

In the first embodiment, the power source PW supplies an input voltage, then the input voltage is rectified by the rectifier circuit RTF, and then the rectified input voltage is provided to the first terminal of the first switch S31 of the third switching component SWC3 as the voltage Vrecti, but the present disclosure is not limited thereto. In practice, the rectifier circuit RTF may be omitted. Under this condition, the input voltage is directly provided to the first terminal of the first switch S31 of the third switching component SWC3.

When the first switching component SWC1, the second switching component SWC2 and the third switching component SWC3 are turned off, the detector circuit DET as shown in FIG. 1 may also detect a voltage Vcheck at a node between the second terminal of the second switch S32 of the third switching component SWC3 as shown in FIG. 3 (or the first switch S3 as shown in FIG. 6) and the first terminal of each of the plurality of high-side switches (such as the first high-side switch H1, the second high-side switch H2 and the third high-side switch H3) (in step SP02 as shown in FIG. 7).

The controller circuit CTR determines whether or not the voltage Vrecti at the node between the first terminal of the first switch S31 of the third switching component SWC3 and the input power source PW is higher than an input voltage threshold N0 (in step SP03 as shown in FIG. 7).

Figure 8:
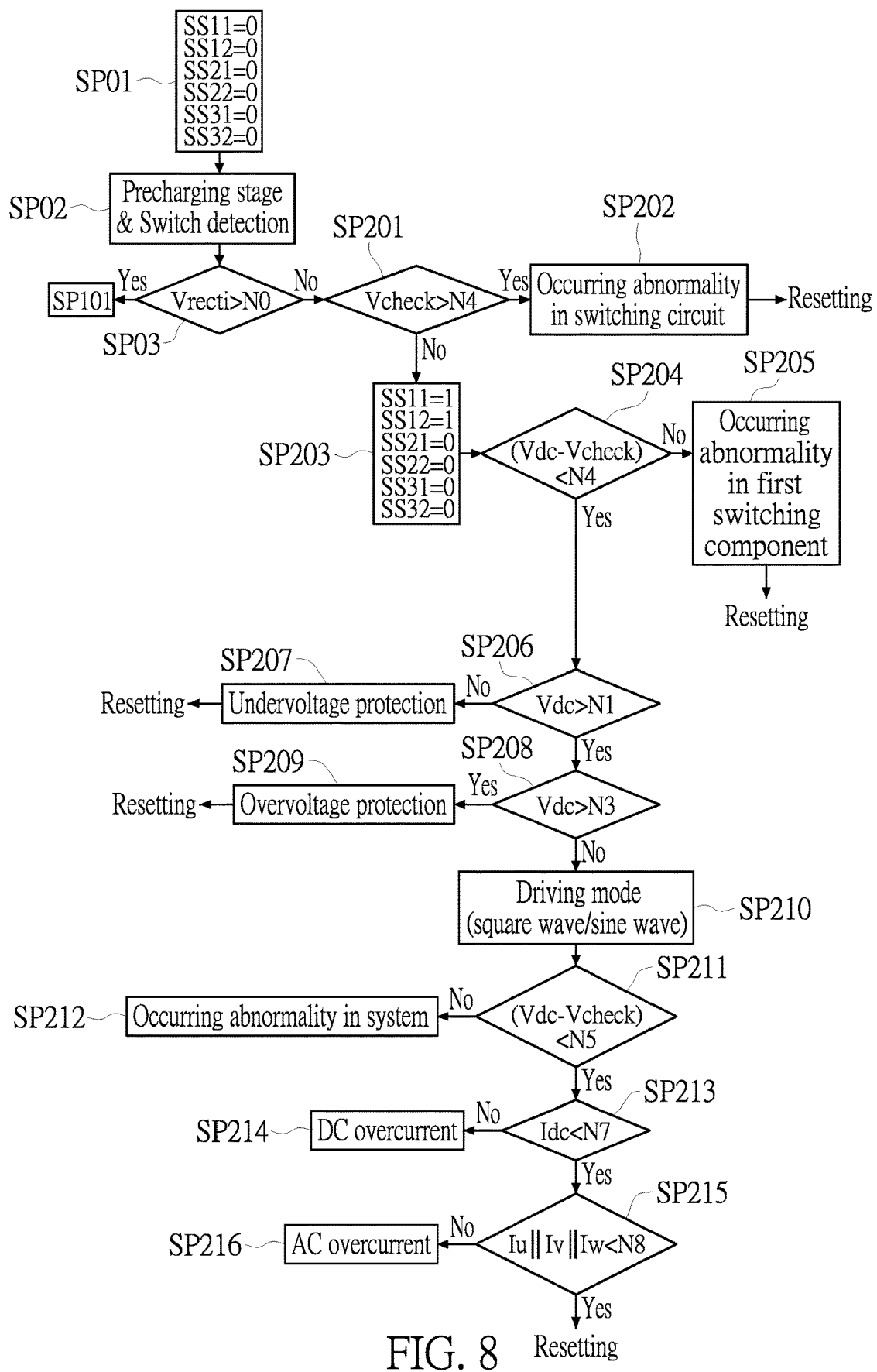
FIG. 8 is a flowchart diagram of steps of the power adjusting method that are performed by the power adjusting system in the motor driving mode according to the first embodiment of the present disclosure.

If the voltage Vrecti at the node between the first terminal of the first switch S31 of the third switching component SWC3 and the input power source PW is not higher than the input voltage threshold N0, the controller circuit CTR determines that the power adjusting system does not receive enough power for charging the battery BT, and accordingly determines not to enter the battery charging mode. At this time, the controller circuit CTR may determine whether to enter the motor driving mode (in step SP201 as shown in FIGS. 7 and 8).

Conversely, if the voltage Vrecti at the node between the first terminal of the first switch S31 of the third switching component SWC3 and the input power source PW is higher than the input voltage threshold N0, the controller circuit CTR may determine to enter the battery charging mode.

When the controller circuit CTR determines to enter the battery charging mode, the controller circuit CTR may determine whether or not the voltage Vcheck at the node between the second terminal of the second switch S32 of the third switching component SWC3 and the first terminal of each of the plurality of high-side switches (such as the first high-side switch H1, the second high-side switch H2 and the third high-side switch H3) is higher than a system static allowable voltage difference N4 (in step SP101 as shown in FIG. 7).

If the voltage Vcheck at the node between the second terminal of the second switch S32 of the third switching component SWC3 and the first terminal of each of the plurality of high-side switches (such as the first high-side switch H1, the second high-side switch H2 and the third high-side switch H3) is higher than the system static allowable voltage difference N4, the controller circuit CTR determines that an abnormality occurs in the switching circuit STW (in step SP102 as shown in FIG. 7), and then may reset or adjust (the switching circuit STW of) the power adjusting system.

Conversely, if the voltage Vcheck at the node between the second terminal of the second switch S32 of the third switching component SWC3 and the first terminal of each of the plurality of high-side switches (such as the first high-side switch H1, the second high-side switch H2 and the third high-side switch H3) is not higher than the system static allowable voltage difference N4, the controller circuit CTR may output the plurality of control signals SS11, SS12, SS31, SS32 at the low level and the plurality of control signals SS21, SS22 at a high level to the switching circuit STW.

As a result, the controller circuit CTR continually turns off the first switch S11 and the second switch S12 of the first switching component SWC1, and the first switch S31 and the second switch S32 of the third switching component SWC3. At the same time, the controller circuit CTR turns on the first switch S21 and the second switch S22 of the second switching component SWC2 (in step SP103 as shown in FIG. 7).

When the first switching component SWC1 and the third switching component SWC3 are turned off and the second switching component SWC2 is turned on, the detector circuit DET may detect a voltage Vdc at a node between the first terminal of the first switch S21 of the second switching component SWC2 as shown FIG. 3 (or the first switch S2 as shown FIG. 6) and the positive terminal of the battery BT (in step SP104 as shown FIG. 7).

The controller circuit CTR subtracts the voltage Vcheck at the node between the second terminal of the second switch S32 of the third switching component SWC3 and the first terminal of each of the plurality of high-side switches (such as the first high-side switch H1, the second high-side switch H2 and the third high-side switch H3) from the voltage Vdc at the node between the first terminal of the first switch S21 of the second switching component SWC2 and the positive terminal of the battery BT to obtain a first charging detected voltage difference (in step SP104 as shown FIG. 7).

The controller circuit CTR determines whether or not the first charging detected voltage difference is lower than the system static allowable voltage difference N4 (in step SP104 as shown FIG. 7).

If the first charging detected voltage difference is not lower than the system static allowable voltage difference N4, the controller circuit CTR determines that an abnormality occurs in the second switching component SWC2 (in step SP105 as shown in FIG. 7), and then may reset or adjust (the second switching component SWC2 of) the power adjusting system.

Conversely, if the first charging detected voltage difference is lower than the system static allowable voltage difference N4, the controller circuit CTR determines that the abnormality does not occur in the second switching component SWC2. Then, the controller circuit CTR may continually turn off the first switch S11 and the second switch S12 of the first switching component SWC1 (in step SP106 as shown in FIG. 7). At the same time, the controller circuit CTR may turn on the first switch S21 and the second switch S22 of the second switching component SWC2, and may turn on the first switch S31 and the second switch S32 of the third switching component SWC3 (in step SP106 as shown in FIG. 7).

When the first switching component SWC1 is turned off and the second switching component SWC2 and the third switching component SWC3 are turned on, the controller circuit CTR may subtract the voltage Vcheck at the node between the second terminal of the second switch S32 of the third switching component SWC3 and the first terminal of each of the plurality of high-side switches (such as the first high-side switch H1, the second high-side switch H2 and the third high-side switch H3) from the voltage Vrecti at the node between the first terminal of the first switch S31 of the third switching component SWC3 and the input power source PW as shown in FIG. 3 to obtain a second charging detected voltage difference.

The controller circuit CTR may determine whether or not the second charging detected voltage difference is lower than the system static allowable voltage difference N4 (in step SP107 as shown in FIG. 7). If the second charging detected voltage difference is not lower than the system static allowable voltage difference N4, the controller circuit CTR determines that an abnormality occurs in the third switching component SWC3 (in step SP108 as shown in FIG. 7), and then may reset or adjust (the third switching component SWC3 of) the third switching component SWC3. Conversely, if the second charging detected voltage difference is lower than the system static allowable voltage difference N4, the controller circuit CTR determines that the abnormality does not occur in the third switching component SWC3.

When the first switching component SWC1 is turned off and the second switching component SWC2 and the third switching component SWC3 are turned on, the controller circuit CTR may determine whether or not the voltage Vrecti at the node between the first terminal of the first switch S31 of the third switching component SWC3 and the input power source PW is higher than a charging undervoltage protection threshold N2 (in step SP109 as shown in FIG. 7).

If the voltage Vrecti at the node between the first terminal of the first switch S31 of the third switching component SWC3 and the input power source PW is not higher than the charging undervoltage protection threshold N2, the controller circuit CTR performs an undervoltage protection operation on the motor driver circuit DRV and the switching circuit STW to adjust or reset a control performed on the motor driver circuit DRV and the switching circuit STW (in step SP110 as shown in FIG. 7). As a result, (the third switching component SWC3 and other circuit components of) the power adjusting system of the present disclosure is prevented from being damaged due to overload. Conversely, if the voltage Vrecti at the node between the first terminal of the first switch S31 of the third switching component SWC3 and the input power source PW is higher than the charging undervoltage protection threshold N2, the controller circuit CTR does not perform the undervoltage protection operation.

When the first switching component SWC1 is turned off and the second switching component SWC2 and the third switching component SWC3 are turned on, the controller circuit CTR may determine whether or not the voltage Vrecti at the node between the first terminal of the first switch S31 of the third switching component SWC3 and the input power source PW is higher than an overvoltage protection threshold N3 (in step SP111 as shown in FIG. 7).

If the voltage Vrecti at the node between the first terminal of the first switch S31 of the third switching component SWC3 and the input power source PW is higher than the overvoltage protection threshold N3, the controller circuit CTR performs an overvoltage protection operation on the motor driver circuit DRV and the switching circuit STW to adjust or reset a control performed on the motor driver circuit DRV and the switching circuit STW (in step SP112 as shown in FIG. 7). As a result, (the third switching component SWC3 and other circuit components of) the power adjusting system of the present disclosure is prevented from being damaged due to overvoltage. Conversely, if the voltage Vrecti at the node between the first terminal of the first switch S31 of the third switching component SWC3 and the input power source PW is not higher than the overvoltage protection threshold N3, the controller circuit CTR does not perform the overvoltage protection operation.

After the controller circuit CTR determines that the abnormalities do not occur in the power adjusting system of the present disclosure (in step SP01 to SP03 and SP01 to SP112), the power adjusting system may enter the battery charging mode (in step SP113 to SP119).

In the battery charging mode, the controller circuit CTR may turn on the second switching component SWC2 and the third switching component SWC3, but turn off the first switching component SWC1 (in steps SP106 and SP113 as shown in FIG. 7).

In the battery charging mode, the controller circuit CTR may determine whether or not the second charging detected voltage difference is lower than a system working allowable voltage difference N5 (in step SP114 as shown in FIG. 7).

If the second charging detected voltage difference is not lower than the system working allowable voltage difference N5, the controller circuit CTR determines that an abnormality occurs in the power adjusting system (in step SP115 as shown in FIG. 7). Conversely, if the second charging detected voltage difference is lower than the system working allowable voltage difference N5, the controller circuit CTR determines that the abnormality does not occur in the power adjusting system.

In the battery charging mode, the detector circuit DET may detect a current Idcr flowing through the second switching component SWC2 to the battery BT. The controller circuit CTR may determine whether or not the current Idcr flowing through the second switching component SWC2 to the battery BT is smaller than a charging current threshold N6 (in step SP116 as shown in FIG. 7).

If the current Idcr flowing through the second switching component SWC2 to the battery BT is not smaller than the charging current threshold N6, the controller circuit CTR determines that an overcurrent condition does not occur (in step SP117 as shown in FIG. 7). Conversely, if the current Idcr flowing through the second switching component SWC2 to the battery BT is smaller than the charging current threshold N6, the controller circuit CTR determines that the overcurrent condition occurs.

In the battery charging mode, the detector circuit DET may detect a phase current Iu flowing through the U-phase of the motor MT such as the three-phase motor, a phase current Iv flowing through the V-phase of the motor MT or a phase current Iw flowing through the W-phase of the motor MT. The controller circuit CTR determines whether or not the phase current Iu, Iv or Iw flowing through the motor MT such as the three-phase motor is smaller than a phase current threshold N8 (in step SP118 as shown in FIG. 7).

If the phase current Iu, Iv or Iw flowing through the motor MT such as the three-phase motor is not smaller than the phase current threshold N8, the controller circuit CTR determines that an overcurrent condition occurs (in step SP119 as shown in FIG. 7). Conversely, if the phase current Iu, Iv or Iw flowing through the motor MT such as the three-phase motor is smaller than the phase current threshold N8, the controller circuit CTR determines that the overcurrent condition does not occur.

After the power adjusting system of the present disclosure performs the operations described above (in steps SP01 to SP03 and SP101 to SP119), the power adjusting system of the present disclosure may be reset.

Reference is made to FIGS. 1 to 5 and FIG. 8, in which FIG. 8 is a flowchart diagram of steps of the power adjusting method that are performed by the power adjusting system in the motor driving mode according to the first embodiment of the present disclosure.

In the power adjusting method of the present disclosure, the power adjusting system as shown in FIG. 3 (or the power adjusting system as shown in FIG. 6) may perform steps SP01 to SP03 and SP201 to SP216 as shown in FIG. 8. The steps SP01 to SP03 are performed before the power adjusting system enters the motor driving mode. The steps SP201 to SP216 are performed when the power adjusting system determines to enter and has entered the motor driving mode.

Before entering the motor driving mode, the controller circuit CTR outputs the plurality of control signals SS11, SS12, SS21, SS22, SS31, SS32 (at the low level) respectively to the control terminals of the first switch S11 and the second switch S12 of the first switching component SWC1 as shown in FIG. 3 (or the control terminal of the first switch S1 as shown in FIG. 6), the control terminals of the first switch S21 and the second switch S22 of the second switching component SWC2 as shown in FIG. 3 (or the control terminal of the first switch S2 as shown in FIG. 6), and the control terminals of the first switch S31 and the second switch S32 of the third switching component SWC3 as shown in FIG. 3 (or the control terminal of the first switch S3 as shown in FIG. 6) (in step SP01 as shown in FIG. 8). As a result, the first switching component SWC1, the second switching component SWC2 and the third switching component SWC3 are turned off.

When the first switching component SWC1, the second switching component SWC2 and the third switching component SWC3 are turned off, the detector circuit DET as shown in FIG. 1 may detect the voltage Vrecti at the node between the first terminal of the first switch S31 of the third switching component SWC3 and the input power source PW as shown in FIG. 3 (in step SP02 as shown in FIG. 8).

When the first switching component SWC1, the second switching component SWC2 and the third switching component SWC3 are turned off, the detector circuit DET as shown in FIG. 1 may also detect the voltage Vcheck at a node between the first terminal of the first switch S11 of the first switching component SWC1 and the first terminal of each of the plurality of high-side switches (such as the first high-side switch H1, the second high-side switch H2 and the third high-side switch H3) (in step SP02 as shown in FIG. 8).

The controller circuit CTR determines whether or not the voltage Vrecti at the node between the first terminal of the first switch S31 of the third switching component SWC3 and the input power source PW is higher than the input voltage threshold N0 (in step SP03 as shown in FIG. 8).

If the voltage Vrecti at the node between the first terminal of the first switch S31 of the third switching component SWC3 and the input power source PW (that is, the input voltage supplied by the input power source PW and then rectified by the rectifier circuit RTF) is higher than the input voltage threshold N0, the controller circuit CTR may determine to enter the battery charging mode (in step SP101 as shown in FIGS. 7 and 8).

Conversely, if the voltage Vrecti at the node between the first terminal of the first switch S31 of the third switching component SWC3 and the input power source PW is not higher than the input voltage threshold N0, the controller circuit CTR determines not to enter the battery charging mode and then may determine whether to enter the motor driving mode (in steps SP201 to SP216 as shown in FIG. 8).

When the controller circuit CTR determines to enter the motor driving mode, the controller circuit CTR may determine whether or not the voltage Vcheck at the node between the second terminal of the first switch S11 of the first switching component SWC1 as shown in FIG. 3 (or the first switch S1 as shown in FIG. 6) and the first terminal of each of the plurality of high-side switches (such as the first high-side switch H1, the second high-side switch H2 and the third high-side switch H3) is higher than the system static allowable voltage difference N4 (in step SP201 as shown in FIG. 8).

If the voltage Vcheck at the node between the second terminal of the first switch S11 of the first switching component SWC1 as shown in FIG. 3 (or the first switch S1 as shown in FIG. 6) and the first terminal of each of the plurality of high-side switches (such as the first high-side switch H1, the second high-side switch H2 and the third high-side switch H3) is higher than the system static allowable voltage difference N4, the controller circuit CTR determines that an abnormality occurs in the switching circuit STW (in step SP202 as shown in FIG. 8), and then may reset or adjust (the switching circuit STW of) the power adjusting system.

Conversely, if the voltage Vcheck at the node between the second terminal of the first switch S11 of the first switching component SWC1 as shown in FIG. 3 (or the first switch S1 as shown in FIG. 6) and the first terminal of each of the plurality of high-side switches (such as the first high-side switch H1, the second high-side switch H2 and the third high-side switch H3) is not higher than the system static allowable voltage difference N4, the controller circuit CTR may output the control signals SS11, SS12, SS31, SS32 at the low level and the control signals SS21, SS22 at the high level to the switching circuit STW.

As a result, the controller circuit CTR continually turns off the first switch S21 and the second switch S22 of the second switching component SWC2, and continually turns off the first switch S31 and the second switch S32 of the third switching component SWC3. At the same time, the controller circuit CTR turns on the first switch S11 and the second switch S12 of the first switching component SWC1 (in step SP203 as shown in FIG. 8).

When the second switching component SWC2 and the third switching component SWC3 are turned off and the first switching component SWC1 is turned on, the detector circuit DET may detect the voltage Vdc at the node between the positive terminal of the battery BT and the second terminal of the second switch S12 of the first switching component SWC1 (in step SP204 as shown in FIG. 8).

The controller circuit CTR subtracts the voltage Vcheck at the node between the first terminal of the first switch S11 of the first switching component SWC1 and the first terminal of each of the plurality of high-side switches (such as the first high-side switch H1, the second high-side switch H2 and the third high-side switch H3) from the voltage Vdc at the node between the positive terminal of the battery BT and the second terminal of the second switch S12 of the first switching component SWC1 to obtain a first driving detection voltage difference (in step SP204 as shown in FIG. 8).

The controller circuit CTR determines whether or not the first driving detection voltage difference is lower than the system static allowable voltage difference N4. If the first driving detection voltage difference is not lower than the system static allowable voltage difference N4, the controller circuit CTR determines that an abnormality occurs in the first switching component SWC1 (in step SP205 as shown in FIG. 8) and then may reset or adjust the first switching component SWC1. Conversely, if the first driving detection voltage difference is lower than the system static allowable voltage difference N4, the controller circuit CTR determines that the abnormality does not occur in the first switching component SWC1.

When the second switching component SWC2 and the third switching component SWC3 are turned off and the first switching component SWC1 is turned on, the controller circuit CTR may determine whether or not the voltage Vdc at the node between the positive terminal of the battery BT and the second terminal of the second switch S12 of the first switching component SWC1 is higher than a battery undervoltage protection threshold N1 (in step SP206 as shown in FIG. 8).

If the voltage Vdc at the node between the positive terminal of the battery BT and the second terminal of the second switch S12 of the first switching component SWC1 is not higher than the battery undervoltage protection threshold N1, the controller circuit CTR performs the undervoltage protection operation on the motor driver circuit DRV and the switching circuit STW to adjust or reset the a control performed on the motor driver circuit DRV and the switching circuit STW (in step SP207 as shown in FIG. 8). As a result, (the third switching component SWC3 and other circuit components of) the power adjusting system of the present disclosure is prevented from being damaged due to overload. Conversely, if the voltage Vdc at the node between the positive terminal of the battery BT and the second terminal of the second switch S12 of the first switching component SWC1 is higher than the battery undervoltage protection threshold N1, the controller circuit CTR does not perform the undervoltage protection operation.

When the second switching component SWC2 and the third switching component SWC3 are turned off and the first switching component SWC1 is turned on, the controller circuit CTR may determine whether or not the voltage Vdc at the node between the positive terminal of the battery BT and the second terminal of the second switch S12 of the first switching component SWC1 is higher than the overvoltage protection threshold N3 (in step SP208 as shown in FIG. 8).

If the voltage Vdc at the node between the positive terminal of the battery BT and the second terminal of the second switch S12 of the first switching component SWC1 is higher than the overvoltage protection threshold N3, the controller circuit CTR performs the overvoltage protection operation on the motor driver circuit DRV and the switching circuit STW to adjust or reset a control performed on the motor driver circuit DRV and the switching circuit STW (in step SP209 as shown in FIG. 8). As a result, (the third switching component SWC3 and other circuit components of) the power adjusting system of the present disclosure is prevented from being damaged due to overvoltage. Conversely, if the voltage Vdc at the node between the positive terminal of the battery BT and the second terminal of the second switch S12 of the first switching component SWC1 is not higher than the overvoltage protection threshold N3, the controller circuit CTR does not perform the overvoltage protection operation.

After the controller circuit CTR determines that the abnormalities do not occur in the circuit components of the power adjusting system of the present disclosure as described above (in steps SP01 to SP03 and SP201 to SP209), the power adjusting system may enter the motor driving mode (in steps SP210 to SP216).

In the motor driving mode, the controller circuit CTR outputs the control signal SS11 (having a plurality of sine wave waveforms or a plurality of square wave waveforms) to the control terminal of the first switch S11 of the first switching component SWC1, and outputs the control signal SS12 (having a plurality of sine wave waveforms or a plurality of square wave waveforms) to the control terminal of the second switch S12 of the first switching component SWC1 to turn on the first switching component SWC1 (in steps SP203 and SP210 as shown in FIG. 8). At the same time, the controller circuit CTR outputs the control signal SS21 at the low level to the control terminal of the first switch S21 of the second switching component SWC2, and outputs the control signal SS22 at the low level to the control terminal of the second switch S22 of the second switching component SWC2, to turn off the second switching component SWC2 (in steps SP203 and SP210 as shown in FIG. 8). At the same time, the controller circuit CTR outputs the control signal SS31 at the low level to the control terminal of the first switch S31 of the third switching component SWC3, and outputs the control signal SS32 at the low level to the control terminal of the second switch S32 of the third switching component SWC3, to turn off the third switching component SWC3 (in steps SP203 and SP210 as shown in FIG. 8).

In the motor driving mode, the controller circuit CTR may determine whether or not the first driving detection voltage difference described above is lower than the system working allowable voltage difference N5 (in step SP211 as shown in FIG. 8).

If the first driving detection voltage difference is not lower than the system working allowable voltage difference N5, the controller circuit CTR determines that an abnormality occurs in the power adjusting system (in step SP212 as shown in FIG. 8). Conversely, if the first driving detection voltage difference is lower than the system working allowable voltage difference N5, the controller circuit CTR determines that the abnormality does not occur in the power adjusting system.

In the motor driving mode, the detector circuit DET may detect the current Idc flowing through the wire between the first terminal of the first switching component SWC1 and each of the plurality of high-side switches (such as the first high-side switch H1, the second high-side switch H2 and the third high-side switch H3). The controller circuit CTR may determine whether or not the current Idc flowing through the wire between the first terminal of the first switching component SWC1 and each of the plurality of high-side switches is smaller than a driving current threshold N7 (in steps SP213 and SP220 as shown in FIG. 8).

If the current Idc flowing through the wire between the first terminal of the first switching component SWC1 and each of the plurality of high-side switches is not smaller than the driving current threshold N7, the controller circuit CTR determines that an overcurrent condition occurs (in steps SP214 and SP221 as shown in FIG. 8).

If the current Idc flowing through the wire between the first terminal of the first switching component SWC1 and each of the plurality of high-side switches is smaller than the driving current threshold N7, the controller circuit CTR determines that the overcurrent condition does not occur (in steps SP214 and SP221 as shown in FIG. 8).

In the motor driving mode, the detector circuit DET may detect the phase current Iu flowing through the U-phase of the motor MT such as the three-phase motor, the phase current Iv flowing through the V-phase of the motor MT or the phase current Iw flowing through the W-phase of the motor MT. The controller circuit CTR determines whether or not the phase current Iu, Iv or Iw flowing through the motor MT such as the three-phase motor is smaller than the driving current threshold N7 (in steps SP215 and SP222 as shown in FIG. 8).

If the phase current Iu, Iv or Iw flowing through the motor MT such as the three-phase motor is not smaller than the driving current threshold N7, the controller circuit CTR determines that an overcurrent condition occurs (in step SP216 as shown in FIG. 8). Conversely, if the phase current Iu, Iv or Iw flowing through the motor MT such as the three-phase motor is smaller than the driving current threshold N7, the controller circuit CTR determines that the overcurrent condition does not occur.

After the power adjusting system of the present disclosure performs the above-mentioned operations (in steps SP01 to SP03 and SP201 to SP216), the power adjusting system of the present disclosure may be reset.

The steps of the power adjusting method as described above are only exemplified, and the present disclosure is not limited thereto. In practice, some of the steps as shown in FIGS. 7 and 8 may be omitted or adjusted.

In conclusion, the present disclosure provides the power adjusting system and method. In the power adjusting system of the present disclosure, an inductor is not additionally disposed, and the nodes between the plurality of high-side switches and the plurality of low-side switches are directly connected to the coils of the motor, thereby reducing circuit costs. Under this condition, the power adjusting system of the present disclosure is still able to effectively drive the motor to rotate and charge the battery. The power adjusting system of the present disclosure performs the power adjusting method of the present disclosure to receive and properly adjust the power from the input power source, and to supply the adjusted power to the battery of the autonomous mobile device, such as the electric vehicle, for charging without using an additional charging pile.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power adjusting system, comprising:
   a switching circuit including a first switching component, a second switching component and a third switching component, wherein a first terminal of the third switching component is connected to an input power source, a second terminal of the third switching component is connected to a first terminal of the first switching component, a second terminal of the first switching component and a first terminal of the second switching component are connected to a positive terminal of a battery, and a second terminal of the second switching component is connected to a first terminal of each of a plurality of coils of a motor;
   a motor driver circuit including a plurality of high-side switches and a plurality of low-side switches, wherein a first terminal of each of the plurality of high-side switches is connected to the second terminal of the third switching component and the first terminal of the first switching component, second terminals of the plurality of high-side switches are respectively connected to first terminals of the plurality of low-side switches and are respectively connected to second terminals of the plurality of coils of the motor, and a second terminal of each of the plurality of low-side switches is connected to a negative terminal of the battery;
   a detector circuit connected to wires between the motor driver circuit and the switching circuit, and configured to detect voltages and currents at the wires between the motor driver circuit and the switching circuit to output a detected signal; and
   a controller circuit connected to the switching circuit, a control terminal of each of the plurality of high-side switches, a control terminal of each of the plurality of low-side switches and the detector circuit, wherein the controller circuit is configured to control operations of each of the plurality of high-side switches, each of the plurality of low-side switches, and the switching circuit according to the detected signal from the detector circuit;
   wherein, in a battery charging mode, the controller circuit turns on the third switching component and the second switching component such that power supplied by the input power source sequentially flows through the third switching component, one or more of the plurality of high-side switches, the motor, and the second switching component to the battery;
   wherein, in a motor driving mode, the controller circuit turns on the first switching component such that power supplied by the input power source sequentially flows through the first switching component and one or more of the plurality of low-side switches to the motor.

2. The power adjusting system according to claim 1, wherein the first switching component includes a first switch and a second switch, the second switching component includes a first switch and a second switch, and the third switching component includes a first switch and a second switch;
   wherein a first terminal of the first switch of the third switching component is connected to the input power source, a second terminal of the first switch of the third switching component is connected to a first terminal of the second switch of the third switching component, and a second terminal of the second switch of the third switching component is connected to the first terminal of each of the plurality of high-side switches;
   wherein, a first terminal of the first switch of the second switching component is connected to the positive terminal of the battery, a second terminal of the first switch of the second switching component is connected to a first terminal of the second switch of the second switching component, and a second terminal of the second switch of the second switching component is connected to the first terminal of each of the plurality of coils of the motor;

wherein, a first terminal of the first switch of the first switching component is connected to the first terminal of each of the plurality of high-side switches, a second terminal of the first switch of the first switching component is connected to a first terminal of the second switch of the first switching component, and a second terminal of the second switch of the first switching component is connected to the positive terminal of the battery.

3. The power adjusting system according to claim 1, further comprising:
   a rectifier circuit connected between the input power source and the first terminal of the third switching component.

4. A power adjusting method, which is applicable to the power adjusting system of claim 1, comprising steps of:
   (a) turning off the first switching component, the second switching component and the third switching component, by the controller circuit;
   (b) detecting a voltage at a node between the first terminal of the third switching component and the input power source, by the detector circuit;
   (c) determining, by the controller circuit, whether to enter the battery charging mode or not, in response to determining to enter the battery charging mode, performing the steps (d) to (f) before entering the battery charging mode, and in response to determining not to enter the battery charging mode, performing the step (g);
   (d) detecting a voltage at a node between the second terminal of the third switching component and the first terminal of each of the plurality of high-side switches, by the detector circuit;
   (e) detecting a voltage at a node between the first terminal of the second switching component and the positive terminal of the battery, by the detector circuit;
   (f) determining, by the controller circuit, whether an abnormality occurs in the second switching component and the third switching component according to the voltage at the node between the first terminal of the third switching component and the input power source, the voltage at the node between the second terminal of the third switching component and the first terminal of each of the plurality of high-side switches, and the voltage at the node between the first terminal of the second switching component and the positive terminal of the battery, and accordingly controlling the operations of each of the plurality of high-side switches, each of the plurality of low-side switches and the switching circuit;
   (g) determining, by the controller circuit, whether to enter the motor driving mode or not, in response to determining to enter the motor driving mode, sequentially performing the steps (h) to (j), and in response to determining not to enter the motor driving mode, returning to the step (a);
   (h) detecting a voltage at a node between the first terminal of the first switching component and each of the plurality of high-side switches, by the detector circuit;
   (i) detecting a voltage at a node between the positive terminal of the battery and the second terminal of the first switching component, by the detector circuit; and
   (j) determining, by the controller circuit, whether an abnormality occurs in the second switching component and the third switching component according to voltage at the node between the first terminal of the first switching component and each of the plurality of high-side switches, and the voltage at the node between the positive terminal of the battery and the second terminal of the first switching component, and accordingly controlling the operations of each of the plurality of high-side switches, each of the plurality of low-side switches and the switching circuit.

5. The power adjusting method according to claim 4, further comprising a step of:
   (k) determining, by the controller circuit, whether or not the voltage at the node between the first terminal of the third switching component and the input power source is higher than an input voltage threshold, in response to determining that the voltage at the node between the first terminal of the third switching component and the input power source is higher than the input voltage threshold, determining to enter the battery charging mode in the step (c), and in response to determining that the voltage at the node between the first terminal of the third switching component and the input power source is not higher than the input voltage threshold, determining not to enter the battery charging mode in the step (c).

6. The power adjusting method according to claim 4, further comprising steps performed after determining to enter the battery charging mode:
   (l) continually turning off the first switching component, the second switching component and the third switching component, by the controller circuit;
   (m) determining, by the controller circuit, whether or not the voltage at the node between the second terminal of the third switching component and the first terminal of each of the plurality of high-side switches is higher than a system static allowable voltage difference, in response to determining that the voltage at the node between the second terminal of the third switching component and the first terminal of each of the plurality of high-side switches is higher than the system static allowable voltage difference, determining that an abnormality occurs in the switching circuit, and in response to determining that the voltage at the node between the second terminal of the third switching component and the first terminal of each of the plurality of high-side switches is not higher than the system static allowable voltage difference, performing the step (n);
   (n) continually turning off the first switching component and the third switching component, and turning on the second switching component, by the controller circuit;
   (o) subtracting, by the controller circuit, the voltage at the node between the second terminal of the third switching component and the first terminal of each of the plurality of high-side switches from the voltage at the node between the first terminal of the second switching component and the positive terminal of the battery to obtain a first charging detected voltage difference;
   (p) determining, by the controller circuit, whether or not the first charging detected voltage difference is lower than the system static allowable voltage difference, in response to determining that the first charging detected voltage difference is not lower than the system static allowable voltage difference, determining that an abnormality occurs in the second switching component, and in response to determining that the first charging detected voltage difference is lower than the system static allowable voltage difference, performing the step (q);
(q) continually turning off the first switching component, and turning on the second switching component and the third switching component, by the controller circuit;
(r) subtracting, by the controller circuit, the voltage at the node between the second terminal of the third switching component and the first terminal of each of the plurality of high-side switches from the voltage at the node between the first terminal of the third switching component and the input power source to obtain a second charging detected voltage difference; and
(s) determining, by the controller circuit, whether or not the second charging detected voltage difference is lower than the system static allowable voltage difference, in response to determining that the second charging detected voltage difference is not lower than the system static allowable voltage difference, determining that an abnormality occurs in the third switching component, and in response to determining that the second charging detected voltage difference is lower than the system static allowable voltage difference, determining that the abnormality does not occur in the third switching component.

7. The power adjusting method according to claim 6, further comprising steps performed in the battery charging mode:
(t) continually turning off the first switching component, and turning on the second switching component and the third switching component, by the controller circuit; and
(u) determining, by the controller circuit, whether or not the second charging detected voltage difference is lower than a system working allowable voltage difference, in response to determining that the second charging detected voltage difference is not lower than the system working allowable voltage difference, determining that an abnormality occurs in the power adjusting system, and in response to determining that the second charging detected voltage difference is lower than the system working allowable voltage difference, determining that the abnormality does not occur in the power adjusting system.

8. The power adjusting method according to claim 4, further comprising steps performed after determining to enter the battery charging mode:
(v) continually turning off the first switching component, and turning on the second switching component and the third switching component, by the controller circuit;
(w) determining, by the controller circuit, whether or not the voltage at the node between the first terminal of the third switching component and the input power source is higher than a charging undervoltage protection threshold, in response to determining that the voltage at the node between the first terminal of the third switching component and the input power source is not higher than the charging undervoltage protection threshold, adjusting control performed on the plurality of high-side switches, the plurality of low-side switches and the switching circuit, and in response to determining that the voltage at the node between the first terminal of the third switching component and the input power source is higher than the charging undervoltage protection threshold, performing the step (x); and
(x) determining, by the controller circuit, whether or not the voltage at the node between the first terminal of the third switching component and the input power source is higher than an overvoltage protection threshold, in response to determining that the voltage at the node between the first terminal of the third switching component and the input power source is higher than the overvoltage protection threshold, adjusting a control performed on the plurality of high-side switches, the plurality of low-side switches and the switching circuit, and in response to determining that the voltage at the node between the first terminal of the third switching component and the input power source is not higher than the overvoltage protection threshold, entering the battery charging mode.

9. The power adjusting method according to claim 4, further comprising steps performed in the battery charging mode:
(y) continually turning off the first switching component, and turning on the second switching component and the third switching component, by the controller circuit;
(z) detecting a current flowing through the second switching component to the battery, by the detector circuit; and
(aa) determining, by the controller circuit, whether or not the current flowing through the second switching component to the battery is smaller than a charging current threshold, in response to determining that the current flowing through the second switching component to the battery is not smaller than the charging current threshold, determining that an overcurrent condition occurs, and in response to determining that the current flowing through the second switching component to the battery is smaller than the charging current threshold, determining that the overcurrent condition does not occur.

10. The power adjusting method according to claim 4, further comprising steps performed in the battery charging mode:
(bb) continually turning off the first switching component, and turning on the second switching component and the third switching component, by the controller circuit;
(cc) detecting a current flowing any one of a plurality of phases of the motor, by the detector circuit; and
(dd) determining, by the controller circuit, whether or not the current flowing through the one of the plurality of phases of the motor is smaller than a phase current threshold, in response to determining that the current flowing through the one of the plurality of phases of the motor is not smaller than the phase current threshold, determining that an overcurrent condition occurs, and in response to determining that the current flowing through the one of the plurality of phases of the motor is smaller than the phase current threshold, determining that the overcurrent condition does not occur.

11. The power adjusting method according to claim 4, further comprising steps performed after determining to enter the motor driving mode:
(ee) continually turning off the first switching component, the second switching component and the third switching component, by the controller circuit;
(ff) determining, by the controller circuit, whether or not the voltage at the node between the first terminal of the first switching component and each of the plurality of high-side switches is higher than a system static allowable voltage difference, in response to determining that the voltage at the node between the first terminal of the first switching component and each of the plurality of high-side switches is higher than the system static allowable voltage difference, determining that an abnormality occurs in the switching circuit, and in response to determining that the voltage at the node between the first terminal of the first switching component and each of the plurality of high-side switches is not higher than the system static allowable voltage difference, performing the step (gg);

(gg) continually turning off the second switching component and the third switching component, and turning on the first switching component, by the controller circuit;

(hh) subtracting, by the controller circuit, the voltage at the node between the voltage at the node between the first terminal of the first switching component and each of the plurality of high-side switches from the voltage at the node between the positive terminal of the battery and the second terminal of the first switching component to obtain a first driving detection voltage difference; and (ii) determining, by the controller circuit, whether or not the first driving detection voltage difference is lower than the system static allowable voltage difference, in response to determining that the first driving detection voltage difference is not lower than the system static allowable voltage difference, determining that an abnormality occurs in the first switching component, and in response to determining that the first driving detection voltage difference is lower than the system static allowable voltage difference, determining that the abnormality does not occur in the first switching component.

12. The power adjusting method according to claim 4, further comprising steps performed after determining to enter the motor driving mode:

(jj) continually turning off the second switching component and the third switching component, and turning on the first switching component, by the controller circuit;

(kk) determining, by the controller circuit, whether or not the voltage at the node between the positive terminal of the battery and the second terminal of the first switching component is higher than a battery undervoltage protection threshold, in response to determining that the voltage at the node between the positive terminal of the battery and the second terminal of the first switching component is not higher than the battery undervoltage protection threshold, adjusting a control performed on the plurality of high-side switches, the plurality of low-side switches and the switching circuit, and in response to determining that the voltage at the node between the positive terminal of the battery and the second terminal of the first switching component is higher than the battery undervoltage protection threshold, performing the step (ll); and (ll) determining, by the controller circuit, whether or not the voltage at the node between the positive terminal of the battery and the second terminal of the first switching component is higher than an overvoltage protection threshold, in response to determining that the voltage at the node between the positive terminal of the battery and the second terminal of the first switching component is higher than the overvoltage protection threshold, adjusting a control performed on the plurality of high-side switches, the plurality of low-side switches and the switching circuit, and in response to determining that the voltage at the node between the positive terminal of the battery and the second terminal of the first switching component is not higher than the overvoltage protection threshold, entering the motor driving mode.

13. The power adjusting method according to claim 12, further comprising steps performed in the motor driving mode:

(mm) subtracting, by the controller circuit, the voltage at the node between the first terminal of the first switching component and each of the plurality of high-side switches from the voltage at the node between the positive terminal of the battery and the second terminal of the first switching component to obtain a first driving detection voltage difference; and (nn) determining, by the controller circuit, whether or not the first driving detection voltage difference is lower than a system working allowable voltage difference, in response to determining that the first driving detection voltage difference is not lower than the system working allowable voltage difference, determining that an abnormality occurs in the power adjusting system, and in response to determining that the first driving detection voltage difference is lower than the system working allowable voltage difference, determining that the abnormality does not occur in the power adjusting system.

14. The power adjusting method according to claim 4, further comprising steps performed in the motor driving mode:

(oo) continually turning off the second switching component and the third switching component, and turning on the first switching component, by the controller circuit;

(pp) detecting, by the detector circuit, a current flowing through the wire between the first terminal of the first switching component and each of the plurality of high-side switches; and (qq) determining, by the controller circuit, whether or not the current flowing through the wire between the first terminal of the first switching component and each of the plurality of high-side switches is smaller than a driving current threshold, in response to determining that the current flowing through the wire between the first terminal of the first switching component and each of the plurality of high-side switches is not smaller than the driving current threshold, determining that an overcurrent condition occurs, and in response to determining that the current flowing through the wire between the first terminal of the first switching component and each of the plurality of high-side switches is smaller than the driving current threshold, determining that the overcurrent condition does not occur.

15. The power adjusting method according to claim 4, further comprising steps performed in the motor driving mode:

(rr) continually turning off the second switching component and the third switching component, and turning on the first switching component, by the controller circuit;

(ss) detecting a current flowing any one of a plurality of phases of the motor, by the detector circuit; and (tt) determining, by the controller circuit, whether or not the current flowing through the one of the plurality of phases of the motor is smaller than a phase current threshold, in response to determining that the current flowing through the one of the plurality of phases of the motor is not smaller than the phase current threshold, determining that an overcurrent condition occurs, and in response to determining that the current flowing through the one of the plurality of phases of the motor is smaller than the phase current threshold, determining that the overcurrent condition does not occur.

\* \* \* \* \*